(12) United States Patent
Lee et al.

(10) Patent No.: US 9,737,168 B2
(45) Date of Patent: Aug. 22, 2017

(54) HAND DRIP COFFEE MAKER

(75) Inventors: Sang Ryong Lee, Daegu (KR); Oh Hyun Kang, Gangwon-do (KR)

(73) Assignee: Kyungpook National University Industry-Academic Cooperation Foundation, Daegu-si (KR)

(*) Notice: Subject to any disclaimer, the term of this patent is extended or adjusted under 35 U.S.C. 154(b) by 725 days.

(21) Appl. No.: 14/344,909

(22) PCT Filed: Sep. 11, 2012

(86) PCT No.: PCT/KR2012/007284
§ 371 (c)(1),
(2), (4) Date: Oct. 23, 2014

(87) PCT Pub. No.: WO2013/039316
PCT Pub. Date: Mar. 21, 2013

(65) Prior Publication Data
US 2015/0075387 A1    Mar. 19, 2015

(30) Foreign Application Priority Data

Sep. 14, 2011    (KR) .......................... 10-2011-0092554

(51) Int. Cl.
*A47J 31/44*    (2006.01)
*A47J 31/46*    (2006.01)
(Continued)

(52) U.S. Cl.
CPC ......... *A47J 31/4403* (2013.01); *A47J 31/005* (2013.01); *A47J 31/02* (2013.01); *A47J 31/057* (2013.01); *A47J 31/46* (2013.01)

(58) Field of Classification Search
USPC ......... 99/290, 316, 279, 301, 285, 305, 304, 99/306, 307, 289 R; 134/117, 198, 148
See application file for complete search history.

(56) References Cited

U.S. PATENT DOCUMENTS 5,931,080 A * 8/1999 Roure Boada ...... A47J 31/4482
                                                    261/DIG. 76
6,406,730 B1 * 6/2002 Banyard ................. A23F 5/243
                                                    426/324
(Continued)

FOREIGN PATENT DOCUMENTS

EP          2218378 A2    8/2010
JP       2001-070168 A    3/2001
(Continued)

*Primary Examiner* — Dana Ross
*Assistant Examiner* — Renee Larose
(74) *Attorney, Agent, or Firm* — Revolution IP, PLLC (57) ABSTRACT

Disclosed is a hand drip coffee maker which includes: a support unit on which a storage container is seated; a ground coffee hopper which is installed on the support unit through a hopper holder, and accommodates ground coffee therein; a mounting post which is installed on the support unit; an arm unit which includes a link arm that is rotatably installed at an upper side of the mounting post so that a tip portion of the link arm is disposed to face the ground coffee hopper; a dripper nozzle which is mounted to the tip portion of the link arm so as to supply water into the ground coffee hopper; and a syrup nozzle which is mounted to the tip portion of the link arm so as to supply syrup into the storage container.

5 Claims, 6 Drawing Sheets

(51) Int. Cl.
*A47J 31/02* (2006.01)
*A47J 31/00* (2006.01)
*A47J 31/057* (2006.01)

(56) References Cited

U.S. PATENT DOCUMENTS

| | | | | |
|---|---|---|---|---|
| 6,810,795 | B1* | 11/2004 | Hsu | A47J 31/4485 99/289 R |
| 7,258,062 | B2* | 8/2007 | Green | A47J 43/12 99/293 |
| 7,353,850 | B2* | 4/2008 | Greiwe | A47J 31/4482 141/198 |
| 7,707,927 | B2* | 5/2010 | Boussemart | A47J 31/061 99/275 |
| 8,333,144 | B2 | 12/2012 | Boussemart et al. | |
| 2007/0031558 | A1* | 2/2007 | Lussi | A47J 31/402 426/520 |

FOREIGN PATENT DOCUMENTS

| | | |
|---|---|---|
| JP | 2006-014922 A | 1/2006 |
| KR | 10-2009-0027292 A | 3/2009 |
| KR | 10-2009-0075650 A | 7/2009 |

\* cited by examiner

HAND DRIP COFFEE MAKER

CROSS REFERENCE TO PRIOR APPLICATIONS

This application is a National Stage Application of PCT International Patent Application No. PCT/KR2012/007284 filed on Sep. 11, 2012, under 35 U.S.C. §371, which claims priority to Korean Patent Application No. 10-2011-0092554 filed on Sep. 14, 2011, which are all hereby incorporated by reference in their entirety.

TECHNICAL FIELD

The present invention relates to a coffee maker, and more particularly, to a hand drip coffee maker which enables water and syrup to be injected in a desired shape through a structure of a plurality of link arms.

BACKGROUND ART

In general, drip coffee refers to coffee that is made by grinding coffee beans and passing hot water through ground coffee so as to achieve maximum aroma of the coffee. The drip coffee is manufactured by putting ground coffee into a dripper in which a filter is mounted, and slowly adding hot water to the ground coffee in the dripper using a drip pot.

Particularly, a barista adds an appropriate amount of water to the ground coffee at first, waits until the ground coffee expands, and adds water again to the ground coffee to extract coffee, and at this time, the barista adds water while drawing a circle, and a manner and time of adding water are different for each barista.

As an apparatus for manufacturing the drip coffee, "Automatic Drip Coffee and Tea Maker (Korean Patent Application Laid-Open No. 10-2009-0027292)" is publicly known.

Figure 1A:
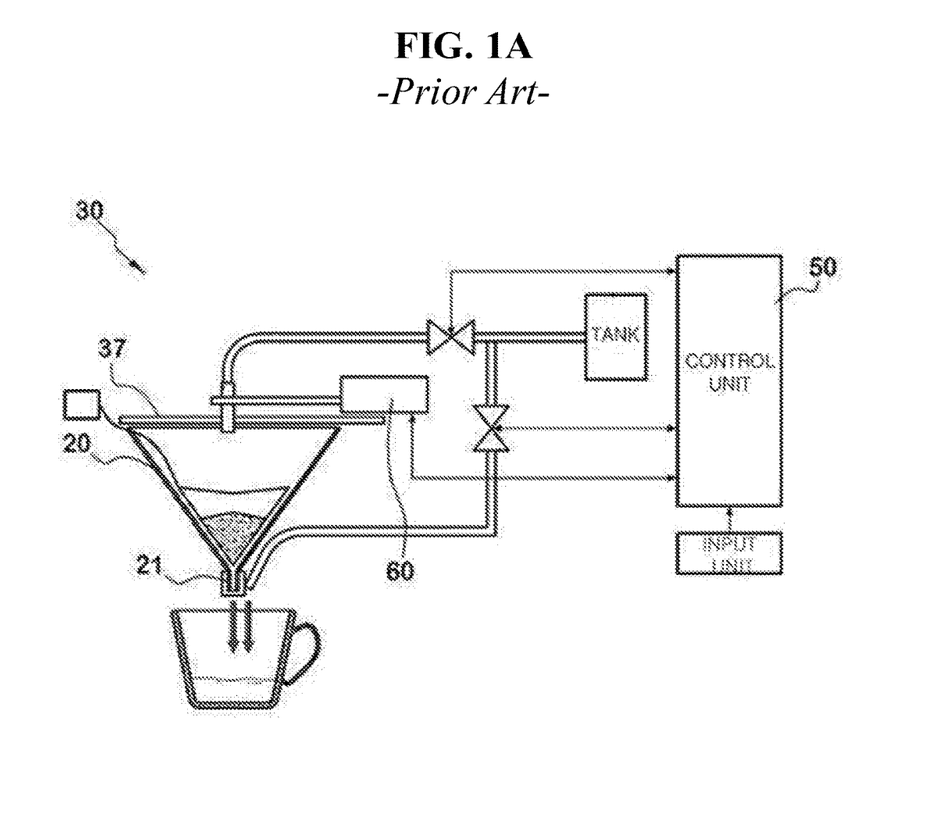
FIGS. 1A to 1B are configuration diagrams illustrating a configuration of an automatic drip coffee and tea maker according to the related art, and a configuration of a drive means, respectively.
Figure 1B:
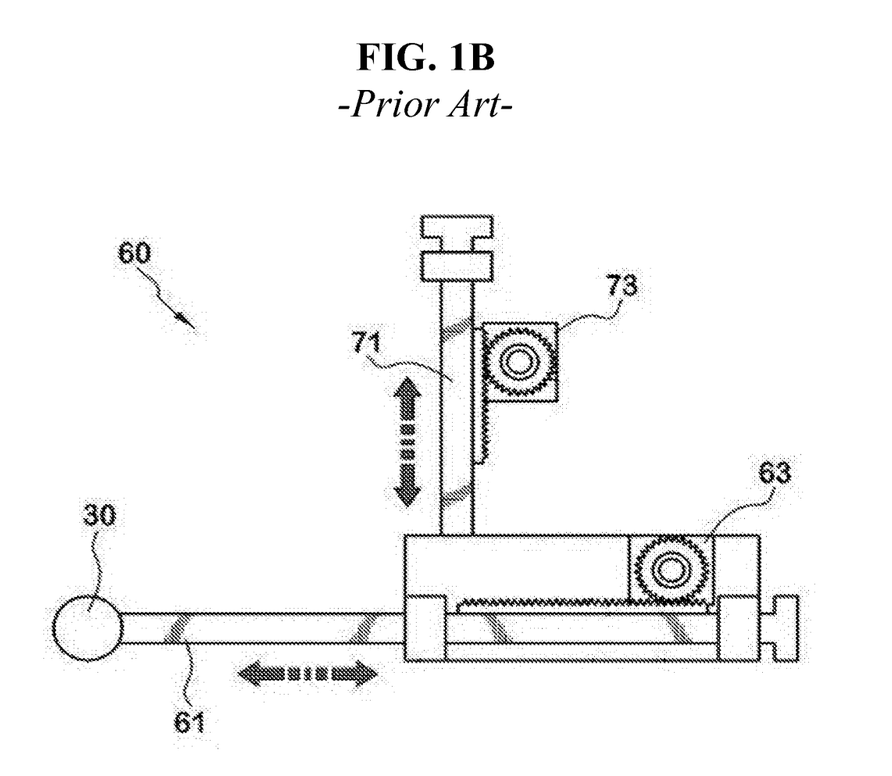

For example, as illustrated in FIGS. 1A and 1B, the related art includes: a hopper 20 which accommodates ground coffee, and has an extraction port 21 formed at a lower portion thereof; a dripper 30 which is disposed above the hopper 20, may be rectilinearly moved and rotated within a predetermined section, and has an end that supplies water into the hopper 20; a drive means 60 which includes a first transfer shaft 61, a first transfer shaft motor 63, a second transfer shaft 71, and a second transfer shaft motor 73 in order to move the dripper 30; and a control unit 50 which operates the drive means 60 depending on a predetermined mode and controls the dripper 30 to provide water into the hopper 20 while being rectilinearly moved and rotated.

However, in the case of the related art, since the first transfer shaft motor is used to rectilinearly move the dripper, and the second transfer shaft motor is used to rotate the dripper, there are problems in that the configuration is complicated which causes an increase in manufacturing costs, and it is difficult to precisely control the rectilinear motion and the rotational motion of the dripper such that taste of coffee that becomes different for each barista cannot be properly obtained.

DISCLOSURE

Technical Problem

An object of the present invention for resolving the aforementioned problems is to provide a hand drip coffee maker capable of supplying water and syrup to ground coffee in a desired direction.

Technical Solution

In order to achieve the object, a hand drip coffee maker according to the present invention includes a support unit, a ground coffee hopper, an arm unit, a dripper nozzle, and a syrup nozzle. A storage container is seated on the support unit, the ground coffee hopper is installed on the support unit through a hopper holder, ground coffee is accommodated in the ground coffee hopper, the arm unit includes a mounting post which is installed on the support unit, and a link arm which is rotatably installed at an upper side of the mounting post so that a tip portion of the link arm is disposed to face the ground coffee hopper, the dripper nozzle is mounted to the tip portion of the link arm so as to supply water into the ground coffee hopper, and the syrup nozzle is mounted to the tip portion of the link arm so as to supply syrup into the storage container.

Preferably, the link arm includes: a first link arm which has one end that is linked to an upper portion of the mounting post through a first rotation motor; and a second link arm which has one end that is linked to the other end of the first link arm through a second rotation motor, and the other end to which the dripper nozzle and the syrup nozzle are mounted.

Preferably, a ground coffee detecting sensor for measuring a height of the ground coffee accommodated in the ground coffee hopper is provided at the tip portion of the link arm.

Preferably, the support unit includes: a support plate on which the storage container is placed; a support bar which is vertically and fixedly installed at one side of the support plate, and to which the hopper holder is rotatably mounted; a support piece which has a half ring shape, and is connected to an upper end of the support bar; and a rotation means which rotates the hopper holder.

Preferably, a water tank for supplying water to the dripper nozzle is installed above the support piece so as to be supported by a plurality of fixing bars, and a syrup tank for supplying syrup to the syrup nozzle is installed on the support piece.

Preferably, the mounting post includes: a lift piece to which the link arm is mounted; an operation rod which is provided with an operation motor so that the lift piece is moved upward and downward, and mounted on the support plate of the support unit; and a guide bar which guides upward and downward movements of the lift piece.

Advantageous Effects

According to the present invention, the following remarkable effects may be implemented.

Firstly, the present invention has an advantage in that water injection and syrup injection may be implemented in a desired shape through the dripper nozzle and the syrup nozzle that may be freely moved.

Secondly, the present invention has an advantage in that free motion of the dripper nozzle may be precisely controlled, and thus a barista may obtain desired taste of coffee using the barista's own unique extraction method.

BEST MODE

Figure 2:
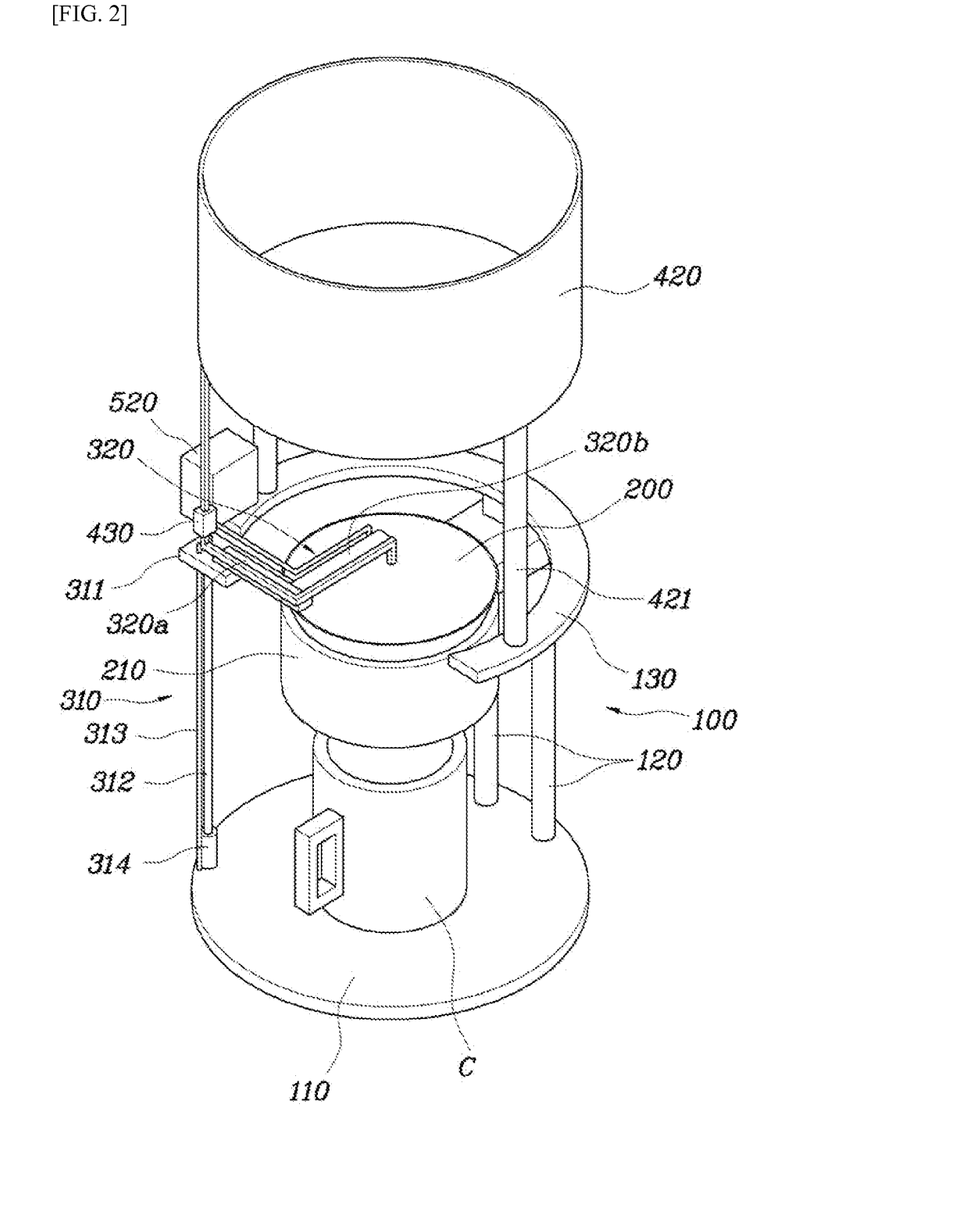
FIG. 2 is a perspective view illustrating a hand drip coffee maker according to the present invention.
Figure 3:
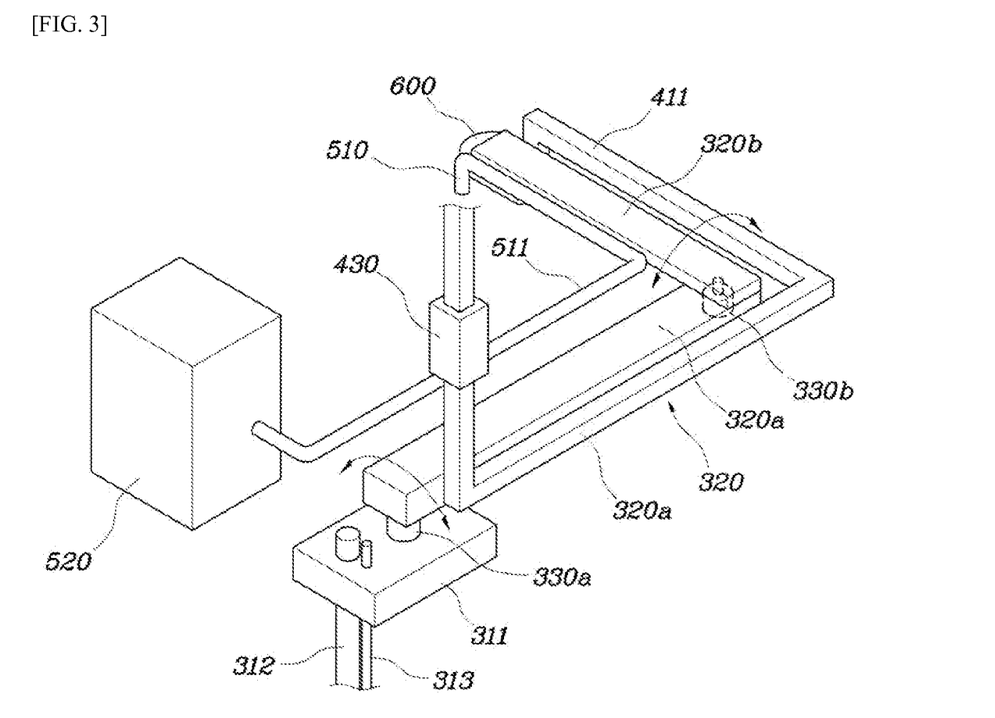
FIG. 3 is an enlarged view enlargedly illustrating a link arm of the hand drip coffee maker according to the present invention.

FIG. 2 is a view illustrating a perspective view of a hand drip coffee maker according to the present invention, and FIG. 3 is a view enlargedly illustrating a link arm of the hand drip coffee maker according to the present invention.

As illustrated in FIGS. 2 and 3, the hand drip coffee maker according to the present invention generally includes a support unit 100, a ground coffee hopper 200, an arm unit, a dripper nozzle 410, and a syrup nozzle 510, and is configured to supply water and syrup in a desired direction using a linkage rotational action of the arm unit.

Specifically, the support unit 100 supports the ground coffee hopper 200, and is configured so that a storage container C is mounted thereon, and the support unit 100 includes a support plate 110, support bars 120, a support piece 130, and a rotation means (not illustrated).

The support plate 110 of the support unit 100 is configured in a plate shape such that a seating groove (not illustrated) on which the storage container C is seated is formed in an upper surface of the support plate 110, and a plurality of support bars 120 is installed at one side of the support plate 110 so as to be spaced apart from each other. The support bars 120 are configured as a pair of support bars 120 that is vertically and fixedly installed at one side of the support plate 110, and a hopper holder 210 is rotatably mounted to any one of the pair of support bars 120 by the rotation means. Here, the rotation means includes a general rotating motor for rotating the hopper holder 210 in one direction.

MODE FOR INVENTION

First, when reference numerals refer to constituent elements of each drawing, it should be noted that although the same constituent elements are illustrated in different drawings, the same constituent elements are referred to by the same reference numerals as possible. In addition, in the description of the present invention, the specific descriptions of publicly known related configurations or functions thereof will be omitted when it is determined that the specific descriptions may obscure the subject matter of the present invention.

An exemplary embodiment of the present invention will be described in detail with reference to the accompanying drawings.

FIG. 2 is a view illustrating a perspective view of a hand drip coffee maker according to the present invention, and FIG. 3 is a view enlargedly illustrating a link arm of the hand drip coffee maker according to the present invention.

As illustrated in FIGS. 2 and 3, the hand drip coffee maker according to the present invention generally includes a support unit 100, a ground coffee hopper 200, an arm unit, a dripper nozzle 410, and a syrup nozzle 510, and is configured to supply water and syrup in a desired direction using a linkage rotational action of the arm unit.

Specifically, the support unit 100 supports the ground coffee hopper 200, and is configured so that a storage container C is mounted thereon, and the support unit 100 includes a support plate 110, support bars 120, a support piece 130, and a rotation means (not illustrated).

The support plate 110 of the support unit 100 is configured in a plate shape such that a seating groove (not illustrated) on which the storage container C is seated is formed in an upper surface of the support plate 110, and a plurality of support bars 120 is installed at one side of the support plate 110 so as to be spaced apart from each other. The support bars 120 are configured as a pair of support bars 120 that is vertically and fixedly installed at one side of the support plate 110, and a hopper holder 210 is rotatably mounted to any one of the pair of support bars 120 by the rotation means. Here, the rotation means includes a general rotating motor for rotating the hopper holder 210 in one direction.

Of course, while the exemplary embodiment has described the configuration in which the hopper holder 210 may be rotated in one direction by the general rotation means, the hopper holder 210 may be rotated in one direction by a manual operation of an operator without using a separate rotation means.

In addition, the support piece 130 has a half ring shape, and is connected to upper ends of the support bars 120, a syrup tank 520 for supplying syrup to the syrup nozzle 510 is installed on the support piece 130, and a plurality of fixing bars 421 for supporting a water tank 420, which will be described below, is provided on an upper surface of the support piece 130. The fixing bars 421 are configured as three fixing bars 421 that are disposed to be spaced apart from each other in a length direction of the support piece 130, thereby stably fixing the water tank 420.

The ground coffee hopper 200 is configured in a funnel shape which accommodates ground coffee, an opening through which water is supplied is formed at an upper portion of the ground coffee hopper 200, and an extraction port (not illustrated) through which extracted coffee is dispensed is formed at a lower portion of the ground coffee hopper 200.

The ground coffee hopper 200 is mounted to the hopper holder 210 so as to be suspended from the hopper holder 210. One end of the hopper holder 200 is rotatably mounted to the support bar 120 by the rotation means, and the ground coffee hopper 200 is clamped at the other end of the hopper holder 200. Here, the rotation means is a general rotation means such as a hinge structure that may rotate the hopper holder 200 in a side direction.

Figure 4:
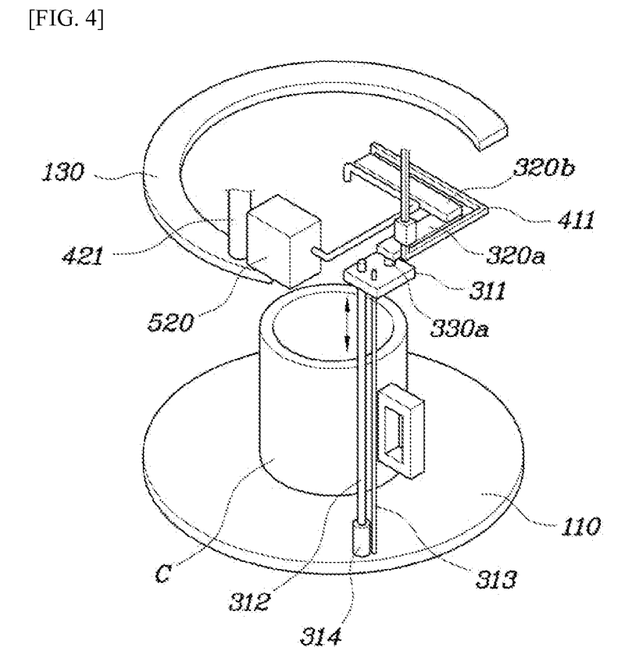
FIG. 4 is a state view illustrating an operation of a mounting post of the hand drip coffee maker according to the present invention.
Figure 5:
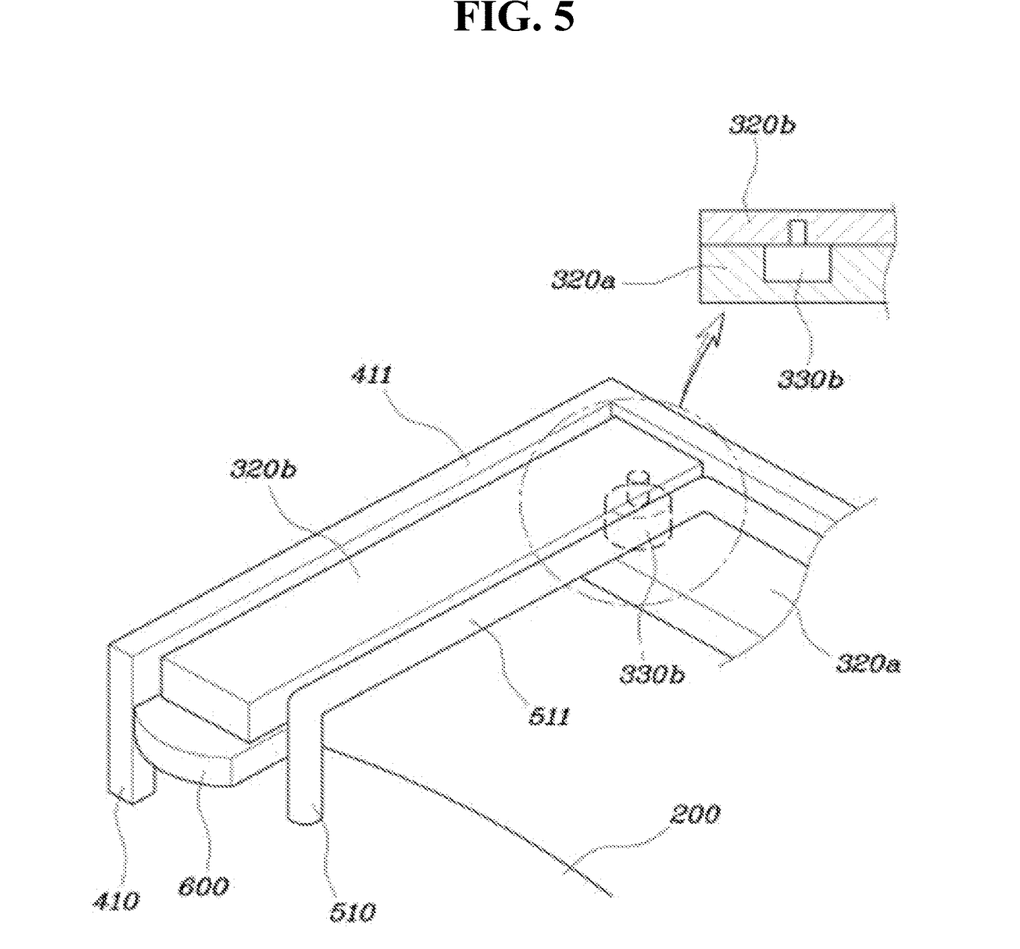
FIG. 5 is an enlarged view enlargedly illustrating a ground coffee detecting sensor of the hand drip coffee maker according to the present invention.

FIG. 4 is a view illustrating an operation of a mounting post of the hand drip coffee maker according to the present invention, and FIG. 5 is a view enlargedly illustrating a ground coffee detecting sensor of the hand drip coffee maker according to the present invention.

The arm unit includes a mounting post 310 which is installed on the support plate 110 of the support unit 100, and a link arm 320 which is rotatably linked and connected to the mounting post 310.

For example, as illustrated in FIG. 4, the mounting post 310 of the arm unit includes a lift piece 311 to which the link arm 320 is mounted, an operation rod 312 which has a lower end mounted on the support plate 110 of the support unit 100, and an upper end rotatably connected to the lift piece 311, an operation motor 314 which rotates the operation rod 312, and a guide bar 313 which guides upward and downward movements of the lift piece 311, and when the operation rod 312 is rotated by an operation of the operation motor 314 in one direction or in the other direction, the lift piece 311 is moved in an upward direction or in a downward direction by the rotation of the operation rod 312 while being guided by the guide bar 313, and as a result, the arm unit, the dripper nozzle 410, and the syrup nozzle 510, which are connected to the lift piece 311, may be moved in the upward and downward directions.

Further, the link arm 320 of the arm unit is configured to be rotatably installed to an upper side of the mounting post 310, more particularly, to the lift piece 311 on the mounting post 310, and includes a first link arm 320a having one end which is linked to an upper portion of the mounting post 310 through a first rotation motor 330a, and a second link arm 320b having one end which is linked to the other end of the first link arm 320a through a second rotation motor 330b.

Therefore, the first link arm 320a may be rotated clockwise or counterclockwise using the first rotation motor 330a as a rotation axis when the first rotation motor 330a is operated, the second link arm 320b may be rotated clockwise or counterclockwise using the second rotation motor 330b as a rotation axis when the second rotation motor 330b is operated, and as a result, by properly controlling the operations of the first rotation motor 330a and the second rotation motor 330b, the dripper nozzle 410 and the syrup nozzle 510, which are mounted on the second link arm 320b, may be freely moved to desired positions.

As illustrated in FIG. 5, a ground coffee detecting sensor 600 for measuring a height of the ground coffee accommodated in the ground coffee hopper 200 may be mounted to a tip portion of the link arm 320.

Accordingly, when the height of the ground coffee in the ground coffee hopper 200 is measured by the ground coffee detecting sensor 600, the lift piece 311 is moved upward and downward by operating the operation motor 314 in consideration of the measured height of the ground coffee, such that heights of the dripper nozzle 410 and the syrup nozzle 510 may be adjusted, thereby preventing the supplied water from spattering by the ground coffee when the water is supplied through the dripper nozzle 410.

The dripper nozzle 410 is mounted to the tip portion of the link arm 320, more particularly, to one side of the other end portion of the second link arm 320b, and connected to the water tank 420 through a drip tube 411 so as to supply water into the ground coffee hopper 200.

Here, a water adjuster 430 may be provided at the drip tube 411. The water adjuster 430 controls a feed rate of the water flowing from the water tank 420 to the dripper nozzle 410 so that a user may supply a desired amount of water into the dripper nozzle 410. As the water adjuster 430, a general water adjusting means for adjusting a flow rate of water is used.

The syrup nozzle 510 is mounted to the tip portion of the link arm 320, more particularly, to the other side of the other end portion of the second link arm 320b, and connected to the syrup tank 520 through a syrup tube 511 so as to supply syrup into the storage container C.

An operational process of the present invention having the aforementioned configurations will be described below.

A filter is mounted in the ground coffee hopper 200, and thereafter, the ground coffee is accommodated in the ground coffee hopper 200. When the ground coffee is accommodated in the ground coffee hopper 200, a drip coffee mode or a Dutch coffee mode is selected by the user.

In a case in which the drip coffee mode is selected by the user, the height of the ground coffee accommodated in the ground coffee hopper 200 is measured by the ground coffee detecting sensor 600, and the operation motor 314 moves the lift piece 311 upward or downward in consideration of the measured height of the ground coffee, and in this case, the height of the dripper nozzle 410 with respect to the ground coffee hopper 200 is adjusted.

Continuously, when water is supplied from the water tank 420 to the drip tube 411, the water adjuster 430 fully opens a flow path (not illustrated) therein so that the water is discharged in the form of a stream of water through the dripper nozzle 410. In this case, the operations of the first rotation motor 330a and the second rotation motor 330b are controlled so that the water in the form of a stream of water flows in a desired shape.

Thereafter, when a desired amount of coffee is extracted, the rotation means is operated to rotate the ground coffee hopper 200 toward one side, the operation motor 314 is driven to move the syrup nozzle 510 downward so that the syrup nozzle 510 becomes close to the storage container C, and thereafter, the syrup is put into the storage container C in a desired shape through the syrup nozzle 510.

Meanwhile, in a case in which the Dutch coffee mode is selected by the user, the height of the ground coffee accommodated in the ground coffee hopper 200 is measured by the ground coffee detecting sensor 600, and the operation motor 314 moves the lift piece 311 upward or downward in consideration of the measured height of the ground coffee, and in this case, the height of the dripper nozzle 410 with respect to the ground coffee hopper 200 is adjusted.

Continuously, when water is supplied from the water tank 420 to the drip tube 411, the water adjuster 430 partially opens the flow path (not illustrated) therein so that the water is discharged in the form of a drop of water, and in this case, the operations of the first rotation motor 330a and the second rotation motor 330b are controlled so that the water in the form of a drop of water flows in a desired shape.

While the present invention has been described in detail using the preferred exemplary embodiment, the scope of the present invention is not limited by the specific exemplary embodiment, but should be construed based on the appended claims. In addition, those skilled in the art will appreciate that various modifications and changes are possible without departing from the scope of the present invention.

INDUSTRIAL APPLICABILITY

The present invention relates to a hand drip coffee maker capable of supplying water and syrup to ground coffee in a desired direction, and therefore, the present invention is industrially applicable.

The invention claimed is:

1. A hand drip coffee maker comprising:
   a support unit which is provided with a support plate on which a storage container is seated;
   a ground coffee hopper which is installed on the support unit through a hopper holder, and accommodates ground coffee therein;
   a mounting post which is installed on the support plate;
   an arm unit which includes a link arm that is rotatably installed at an upper side of the mounting post so that a tip portion of the link arm is disposed to face the ground coffee hopper;
   a dripper nozzle which is mounted to the tip portion of the link arm so as to supply water into the ground coffee hopper; and
   a syrup nozzle which is mounted to the tip portion of the link arm so as to supply syrup into the storage container,
   wherein the link arm includes:

a first link arm which has one end that is linked to an upper portion of the mounting post through a first rotation motor; and a second link arm which has one end that is linked to the other end of the first link arm through a second rotation motor, and the other end to which the dripper nozzle and the syrup nozzle are mounted.

2. The hand drip coffee maker of claim 1, wherein a ground coffee detecting sensor for measuring a height of the ground coffee accommodated in the ground coffee hopper is provided at the tip portion of the link arm.

3. The hand drip coffee maker of claim 1, wherein the support unit includes:

the support plate on which the storage container is placed;

a support bar which is vertically and fixedly installed at one side of the support plate, and to which the hopper holder is rotatably mounted;

a support piece which has a half ring shape, and is connected to an upper end of the support bar; and a rotation means which rotates the hopper holder.

4. The hand drip coffee maker of claim 1, wherein a water tank for supplying water to the dripper nozzle is installed above the support piece so as to be supported by a plurality of fixing bars, and a syrup tank for supplying syrup to the syrup nozzle is installed on the support piece.

5. The hand drip coffee maker of claim 1, wherein the mounting post includes:

a lift piece to which the link arm is mounted;

an operation rod which is provided with an operation motor so that the lift piece is moved upward and downward, and mounted on the support plate of the support unit; and a guide bar which guides upward and downward movements of the lift piece.

\* \* \* \* \*